United States Patent
Ito et al.

(10) Patent No.: US 6,707,189 B2
(45) Date of Patent: Mar. 16, 2004

(54) IMAGE PICKUP APPARATUS AND DRIVING APPARATUS

(75) Inventors: Tetsuya Ito, Nagoya (JP); Kenichi Ito, Zama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/117,181

(22) Filed: Apr. 8, 2002

(65) Prior Publication Data

US 2002/0145346 A1 Oct. 10, 2002

(30) Foreign Application Priority Data

Apr. 9, 2001 (JP) ........................ 2001-109664

(51) Int. Cl.$^7$ .................. H02K 7/116; F16M 11/12
(52) U.S. Cl. ................ 310/75 R; 310/67 R; 310/112; 248/652; 396/427
(58) Field of Search ................ 248/651–652, 248/660; 396/12–13, 427–428; 310/75 R, 67 R, 112, 114

(56) References Cited

U.S. PATENT DOCUMENTS

| | | | | |
|---|---|---|---|---|
| 3,732,368 A | * | 5/1973 | Mahlab | 348/151 |
| 4,736,218 A | * | 4/1988 | Kutman | 396/427 |
| 5,289,091 A | * | 2/1994 | Wada | 318/282 |
| 6,154,317 A | * | 11/2000 | Segerstrom et al. | 359/554 |
| 6,370,329 B1 | * | 4/2002 | Teuchert | 396/7 |
| 6,479,813 B2 | * | 11/2002 | Takada et al. | 250/239 |

FOREIGN PATENT DOCUMENTS

| | | | |
|---|---|---|---|
| JP | 6-3251 | 1/1994 | |
| JP | 7-77247 | 3/1995 | |
| JP | 9-47003 | 2/1997 | |
| JP | 9-284612 | * 10/1997 | .......... H04N/5/222 |
| JP | 10-257358 | 9/1998 | |
| JP | 11-18366 | 1/1999 | |

* cited by examiner

*Primary Examiner*—Burton Mullins
(74) *Attorney, Agent, or Firm*—Finnegan, Henderson, Farabow, Garrett & Dunner, L.L.P.

(57) ABSTRACT

An image pickup apparatus comprise a camera unit for photographing a subject and a driving device for driving the camera unit in a circumferential angle direction and an elevation angle direction, wherein the driving device includes a motor which drives the camera unit in the circumferential angle direction, and a motor which drives the camera unit in the elevation angle direction, and each of the motor and the motor is constituted of a permanent magnet motor including a planetary reduction gear.

20 Claims, 4 Drawing Sheets

IMAGE PICKUP APPARATUS AND DRIVING APPARATUS

CROSS-REFERENCE TO RELATED APPLICATIONS

This application is based upon and claims the benefit of priority from the prior Japanese Patent Application No. 2001-109664, filed Apr. 9, 2001, the entire contents of which are incorporated herein by reference.

BACKGROUND OF THE INVENTION

1. Field of the Invention

The present invention relates to an image pickup apparatus and driving apparatus in which two shafts substantially crossing at right angles to each other can be used to position objects such as a small-sized camera in a circumferential angle direction and elevation angle direction.

2. Description of the Related Art

In some of conventional driving apparatuses, as disclosed, for example, in Jpn. Pat. Appln. KOKAI Publication Nos. 1997-47003, 1995-77247, and 1999-18366, a planetary reduction gear is disposed inside a motor rotor.

Moreover, as disclosed, for example, in Jpn. Pat. Appln. KOKOKU Publication No. 1994-3251 and Jpn. Pat. Appln. KOKAI Publication No. 1998-257358, a universal head is connected to an output shaft of a driving motor via the planetary reduction gear.

These are known examples, but a concrete construction for rotating the head in a circumferential angle direction and elevation angle direction is not disclosed, and the head can be rotate in only one direction. Moreover, the examples do no disclose a construction for disposing a wiring so as to prevent the wiring from disturbing the rotation, for example, even when a small-sized camera is laid on the universal head. During the rotation, it is a very important matter that the wiring does not disturb the rotation.

BRIEF SUMMARY OF THE INVENTION

An object of the present invention is to determine a rotation position of a body with respect to both a circumferential angle direction and an elevation angle direction, and another object is to prevent rotation from being disturbed by a wiring connected to the body during the rotation.

According to the present invention, there is provided an image pickup apparatus comprising: an image pickup device for photographing a subject; and a driving device for driving the image pickup device in a circumferential angle direction and an elevation angle direction, wherein the driving device includes a first driving device which drives the image pickup device in the circumferential angle direction, and a second driving device which drives the image pickup device in the elevation angle direction, and each of the first driving device and the second driving device is constituted of a permanent magnet motor including a planetary reduction gear.

Additional objects and advantages of the invention will be set forth in the description which follows, and in part will be obvious from the description, or may be learned by practice of the invention. The objects and advantages of the invention may be realized and obtained by means of the instruments and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
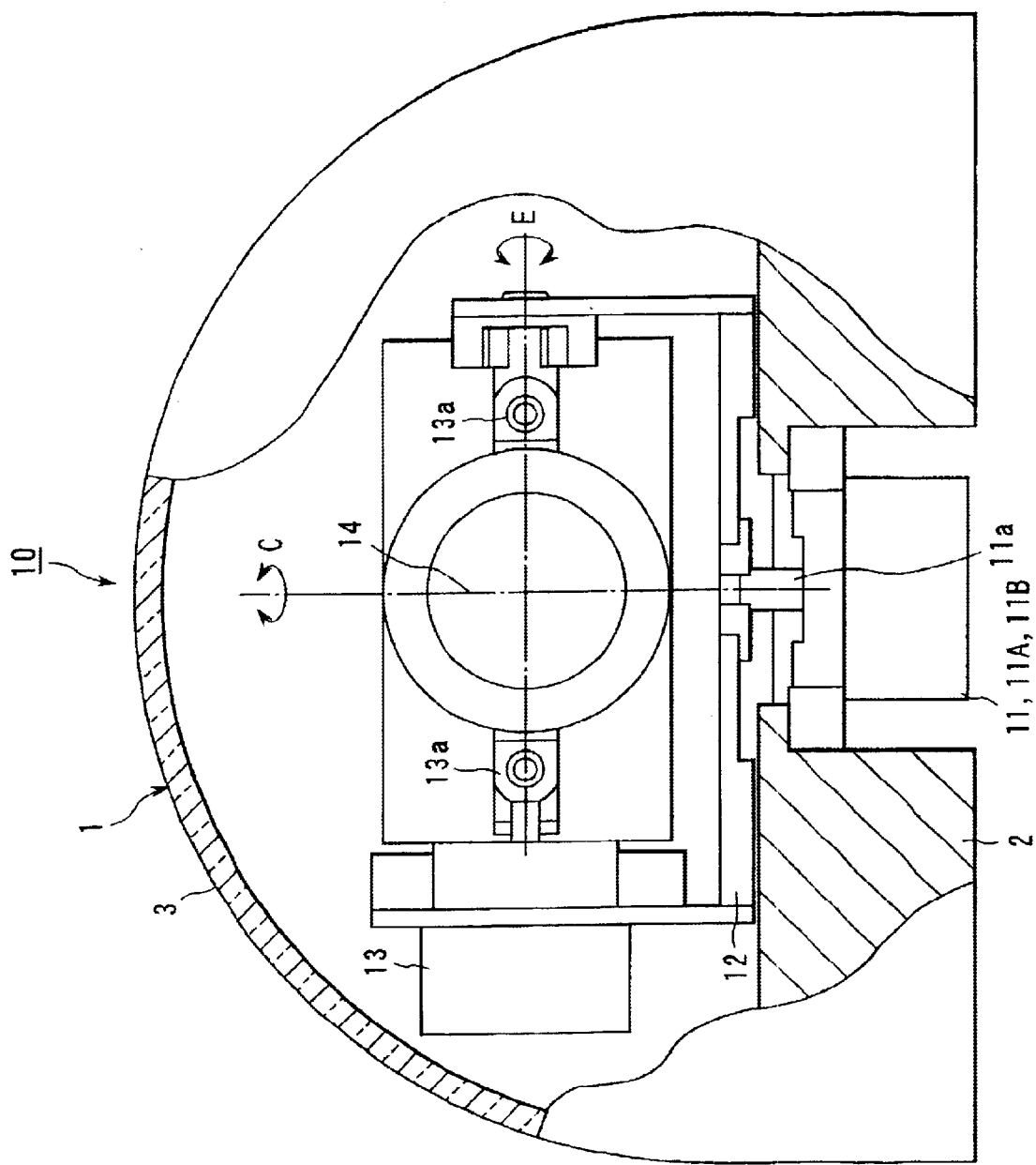
FIG. 1 is a partially cutaway side view of an image pickup apparatus of the present invention.

A first embodiment in the present invention will be described hereinafter with reference to the drawings. FIG. 1 is a partially cutaway side view of an image pickup apparatus 1 of the present invention. The image pickup apparatus 1 includes a frame 2 having a circular plate shape and having an opening in the middle thereof, and a transparent cover 3 with which the upper surface of the frame 2 is covered. A motor (first driving device) 11 is attached to the opening of the frame 2, while a rotation shaft 11a is disposed in a vertical direction. Moreover, a base 12 on which a camera unit 14 is laid as described later is attached to the tip end of the rotation shaft 11a so as to be freely rotatable along a circumferential angle direction C.

A motor (second driving device) 13 is attached to the base 12, while a rotation shaft 13a is disposed in a horizontal direction. Moreover, the camera unit 14 is attached to the tip end of the rotation shaft 13a so as to be freely rotatable along the elevation angle direction E.

Each of the motors 11, 13 is constituted of a permanent magnet motor. When the motor 11 is driven, the base 12 is driven in the circumferential angle direction C. When the motor 13 is driven, the camera unit 14 is driven in an elevation angle direction E.

Figure 2:
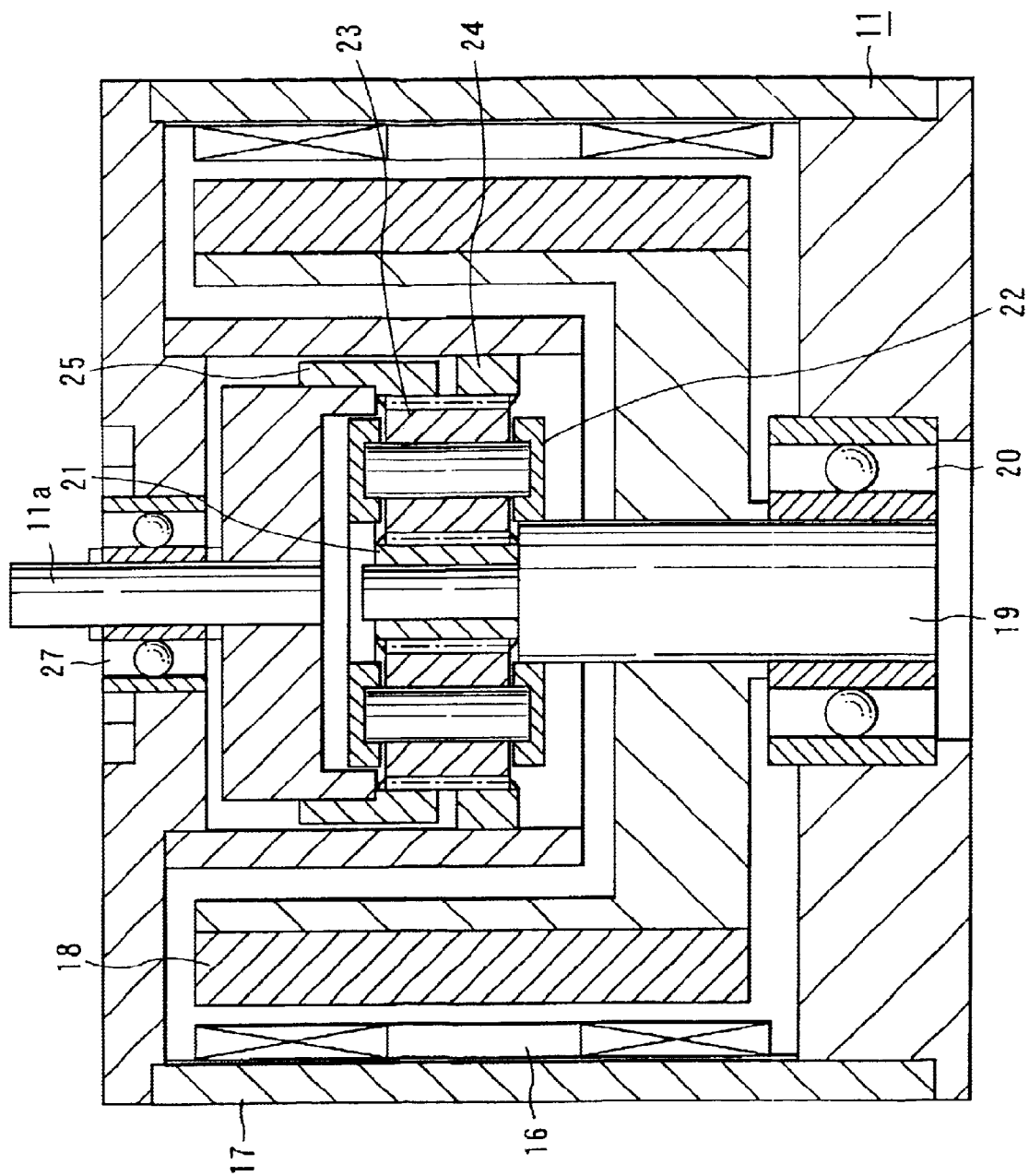
FIG. 2 is a longitudinal sectional view showing a permanent magnet motor according to a first embodiment for use in the image pickup apparatus.

FIG. 2 is a longitudinal sectional view showing the motor 11. Additionally, since the motor 11 is the same as the motor 13, the motors can be used in common, and this results in cost reduction of the image pickup apparatus 1. The structure of the motor 11 will representatively be described hereinafter.

For example, six stator coils 16 are arranged inside a motor housing 17 formed of a magnetic material. A rotor 18 is constituted of a permanent magnet and, for example, eight poles are magnetized. Moreover, the rotor 18 is supported by a rotation shaft 19, and can rotate around the rotation shaft 19 via a bearing 20. Here, for the rotation of the rotation shaft 19, when a general three-phases (six coils) motor is assumed, the motor can be driven by successively supplying power to the coils inside the motor housing 17.

Furthermore, a speed reduction mechanism by a wonder planetary gear is incorporated in the motor 11. That is, inside the rotor 18, a pinion gear 21 is coaxially fixed to the rotation shaft 19. Moreover, in the outer periphery of the pinion gear 21, three planetary gears 23 are disposed so as to be rotatable around the rotation shaft 19 or on their own axes, while mutual relative positions are maintained by a carrier 22. The planetary gear 23 meshes with the pinion gear 21 and fixed internal gear 24. Additionally, the fixed internal gear 24 is disposed coaxially with the rotation shaft 19 and fixed onto the motor housing 17.

On the other hand, the planetary gear 23 also meshes with a rotary internal gear 25 (having the number of teeth different from the number of teeth of the fixed internal gear 24) disposed coaxially with the rotation shaft 19. The rotary internal gear 25 is disposed so as to be rotatable on its own axis, and is connected to a driving shaft 26. That is, with the rotation of the rotary internal gear 25 on its own axis, the driving shaft 26 is supported by a bearing 27 and rotated.

With this constitution, the wonder planetary gear is formed. A wonder planetary gear comprises: a driving gear (corresponding to the external gear of an ordinary type of sun gear) including a rotating shaft; a planetary gear which meshes with the driving gear, is revolvable around the axis of rotation of the rotating shaft of the driving gear, and is rotatable on its own axis of rotation that is parallel to the axis of rotation of the rotating shaft; a fixed internal gear (corresponding to the internal gear of the ordinary type of sun gear) which is coaxial with the rotating shaft and has an inner circumference meshing with the planetary gear; and a rotary internal gear which is coaxial with the rotating shaft, has an inner circumference meshing with the planetary gear, and has teeth differing in number from those of the fixed internal gear.

A wonder planetary gear is featured in that the ratio of the number of rotations the rotary internal gear makes to the number of rotations the driving gear makes can be increased. Because of this feature, the wonder planetary gear advantageously provides a large decelerating ratio.

Here, particularly when the wonder planetary gear is used, a holding torque is large even with a small size, and the motor can be stopped in an optional position. When the wonder planetary gear is formed insides the motor housing 17 as described above, a reduction ratio of the driving shaft 26 to the rotation shaft 19 can be enlarged, and a large torque can be obtained.

Concretely, assuming that the number of teeth of the pinion gear 21 is 15, the number of teeth of the planetary gear 23 is 20, the number of teeth of the fixed internal gear 24 is 54, the number of teeth of the rotary internal gear 25 is 57, and a module is 0.1, the reduction ratio is 87.4.

Moreover, the driving device of the circumferential angle direction C and elevation angle direction E can be small-sized. Furthermore, since the gear mechanism is used, the holding torque is applied, and the rotation can be held in the optional position.

Furthermore, according to the present invention, in the driving apparatus in which the similar motors are used to drive two shafts, a unit with various gear mechanisms integrally formed therein as described above can be manufactured by attaching a driving object (here, camera unit 14) to the driving shaft 26. As a result, a manufacturing process can be simplified.

Figure 3:
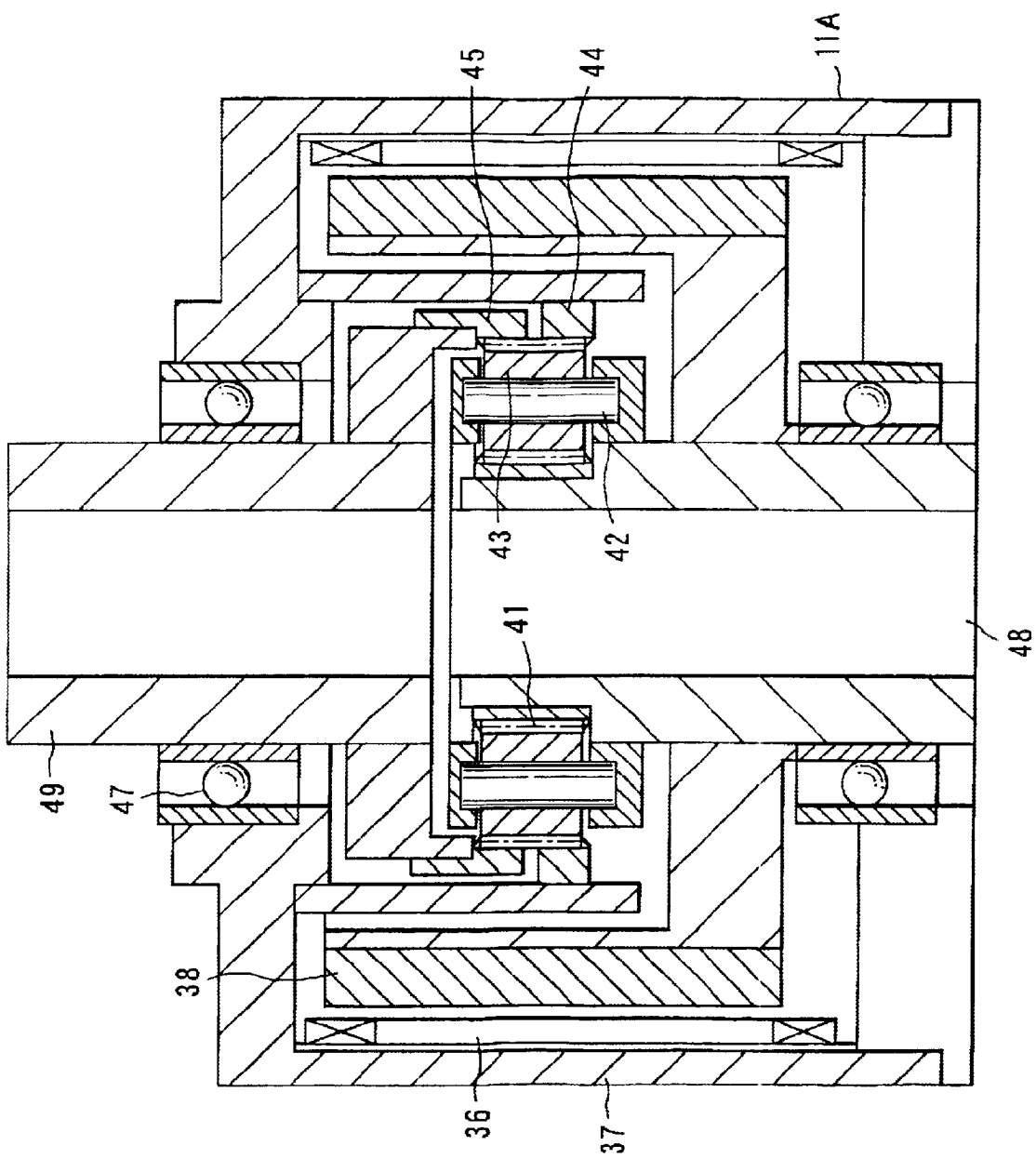
FIG. 3 is a longitudinal sectional view showing the permanent magnet motor according to a second embodiment for use in the image pickup apparatus.

FIG. 3 is a longitudinal sectional view showing a motor 11A according to a second embodiment of the present invention. The second embodiment is different from the first embodiment in that a rotation shaft 48 and driving shaft 49 have a hollow pipe structure in the motor 11A for driving the apparatus in the circumferential angle direction C. Other constitutions are substantially similar to those of the first embodiment.

For example, six stator coils 36 are disposed inside a motor housing 37 formed of the magnetic material. Moreover, a rotor 38 is constituted of the permanent magnet and, for example, eight poles are magnetized. Furthermore, the rotor 38 is supported on a rotation shaft 48, and can rotate around the rotation shaft 48 via a bearing 47. Here, for the rotation of the rotation shaft 48, when the general three-phases (six coils) motor is assumed, the apparatus can be driven by successively supplying power to the coils in the motor housing 37.

Moreover, the speed reduction mechanism by the wonder planetary gear is incorporated in the motor 11A. That is, inside the rotor 38, a pinion gear 41 is coaxially fixed to the rotation shaft 49. Moreover, in the outer periphery of the pinion gear 41, three planetary gears 43 are disposed so as to be rotatable around the rotation shaft 49 or on their own axes, while the mutual relative positions are maintained by a carrier 42. The planetary gear 43 meshes with the pinion gear 41 and fixed internal gear 44. Additionally, the fixed internal gear 44 is disposed coaxially with the rotation shaft 49 and fixed onto the motor housing 37.

On the other hand, the planetary gear 43 also meshes with a rotary internal gear 45 (having the number of teeth different from the number of teeth of the fixed internal gear 44) disposed coaxially with the rotation shaft 49. The rotary internal gear 45 is disposed so as to be rotatable on its own axis, and is connected to a driving shaft 46. That is, with the rotation of the rotary internal gear 45 on its own axis, the driving shaft 46 is supported by the bearing 47 and rotated.

Different from the first embodiment, since the rotation shaft 48 and driving shaft 49 have the hollow pipe structure, a space for passing a wiring is produced. That is, with the hollow pipe structure, in addition to advantages of the first embodiment, a wiring for supplying power to the motor 13 and camera unit 14 which rotate in the elevation angle direction E can be disposed without hindering the rotation.

Figure 4:
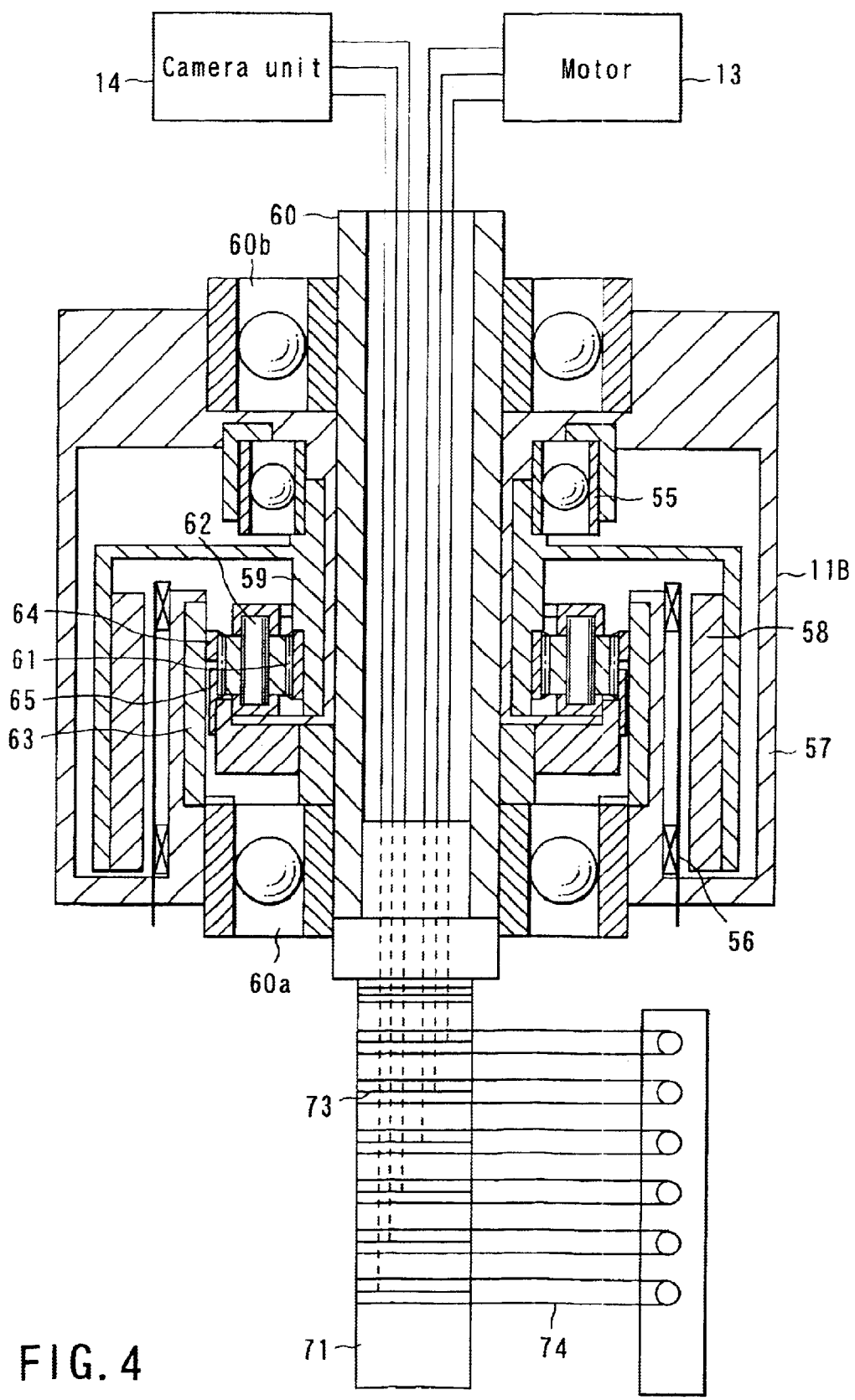
FIG. 4 is a longitudinal sectional view showing the permanent magnet motor according to a third embodiment for use in the image pickup apparatus.

FIG. 4 is a longitudinal sectional view showing a motor 11B according to a third embodiment of the present invention. The third embodiment is different from the second embodiment in that a rotation shaft 60 and driving shaft 71 have a hollow pipe structure, and a slip ring 73 (conductive member) is attached to the driving shaft 71 in the motor 11A for driving the apparatus in the circumferential angle direction C. Moreover, a brush 74 electrically connected to the slip ring 73 is disposed outside the driving shaft 71. With this constitution, the wiring for supplying power to the motor 13 and camera unit 14 which rotate further in the elevation angle direction E can be disposed without hindering the rotation as compared with the second embodiment. Other constitutions are similar to those of the first embodiment. That is, the speed reduction mechanism by the wonder planetary gear is incorporated in a motor 11B.

For example, six stator coils 36 are disposed inside a motor housing 57 formed of the magnetic material. Moreover, a rotor 58 is constituted of the permanent magnet and, for example, eight poles are magnetized. Furthermore, the rotor 58 is supported on a rotation shaft 59, and can rotate around the rotation shaft 60 via a bearing 55. Here, for the rotation of the rotation shaft 60, when the general three-phases (six coils) motor is assumed, the apparatus can be driven by successively supplying power to the coils in the motor housing 57. Additionally, the rotation shaft 60 is rotatably supported by the motor housing 57 via bearings 60a, 60b.

Furthermore, inside the rotor 58, a pinion gear 61 is coaxially fixed to the rotation shaft 60. Moreover, in the outer periphery of the pinion gear 61, three planetary gears 63 are disposed so as to be rotatable around the rotation shaft 60 or on their own axes, while the mutual relative positions are maintained by a carrier 62. The planetary gear 63 meshes with the pinion gear 21 and fixed internal gear 64. Additionally, the fixed internal gear 64 is disposed coaxially with the rotation shaft 60 and fixed onto the motor housing 57.

On the other hand, the planetary gear 63 also meshes with a rotary internal gear 65 (having the number of teeth different from the number of teeth of the fixed internal gear 64) disposed coaxially with the rotation shaft 60. The rotary internal gear 65 is disposed so as to be rotatable on its own axis, and is connected to the driving shaft 71. That is, with the rotation of the rotary internal gear 65 on its own axis, the driving shaft 71 is supported by the bearings 60a, 60b and rotated. This constitution forms the wonder planetary gear.

In a manner that is different from the second embodiment, a space for passing the wiring is produced, since the rotation shaft 60 and driving shaft 71 have a hollow pipe structure. That is, with the hollow pipe structure, in addition to the advantages of the first embodiment, a wiring for supplying power to the motor 13 and camera unit 14 which rotate in the elevation angle direction B can be disposed without hindering the rotation.

Additionally, the camera unit 14 is used here, but this is not limited as long as the object requires the wiring, and the number of poles of the motor is not limited. Moreover, the present invention can be applied both to the inner rotor type permanent magnet motor and the outer rotor type permanent magnet motor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image pickup apparatus comprising:
   an image pickup device for photographing a subject; and
   a driving device for driving the image pickup device in a circumferential angle direction and an elevation angle direction,
   wherein said driving device includes a first driving device which drives said image pickup device in the circumferential angle direction, and a second driving device which drives said image pickup device in the elevation angle direction, and
   each of said first driving device and said second driving device constitutes a permanent magnet motor including a planetary reduction gear,
   wherein said permanent magnet motor includes:
   a stator having a winding;
   a rotor which has a permanent magnet, and rotates by passing a current through said winding;
   a rotation shaft which is formed integrally with the rotor, and has a driving gear formed on an outer periphery thereof;
   a planetary gear which is disposed so as to be rotatable around an axis center line of the rotation shaft and meshes with said driving gear, and which is disposed so as to be rotatable on an axis center line extending in parallel to an axial direction of said rotation shaft;
   a fixed internal gear which is disposed coaxially with said rotation shaft, fixed to said stator, and meshes with said planetary gear in an inner periphery thereof;
   a rotary internal gear which is disposed coaxially with said rotation shaft, disposed so as to be freely rotatable around said axis center line, meshes with said planetary gear in the inner periphery thereof and has the number of teeth different from the number of teeth of said fixed internal gear; and
   a driving shaft which rotates integrally with the rotary internal gear.

2. The image pickup apparatus according to claim 1, wherein said permanent magnet motor includes a hollow portion present inside a driving shaft which outputs a driving force, and a wiring connected to said image pickup device through the hollow portion.

3. The image pickup apparatus according to claim 2, wherein said permanent magnet motor includes:
   a conductive member disposed on said driving shaft; and
   a conducting member which is connected to the conductive member and secures conduction of electricity to the outside from said first driving device or said second driving device.

4. The image pickup apparatus according to claim 1, wherein said permanent magnet motor includes a conductive member disposed on said driving shaft, and a conducting member which is connected to the conductive member and secures conduction of electricity to the outside from said first driving device or said second driving device.

5. The image pickup apparatus according to claim 1, wherein said fixed internal gear has teeth which are smaller in number than those of the rotary internal gear.

6. The image pickup apparatus according to claim 5, wherein a teeth number difference between the fixed internal gear and the rotary internal gear is equal to the number of planetary gears provided.

7. The image pickup apparatus according to claim 1, wherein said planetary gears are at least three in number.

8. The image pickup apparatus according to claim 7, further comprising a control member configured to control a change in a relative position of the axis center line of the planetary gear.

9. The image pickup apparatus according to claim 1, wherein said first and second driving devices are made of permanent magnet motors that are similar in structure.

10. The image pickup apparatus according to claim 1, wherein said winding is a three-phase winding.

11. A driving apparatus comprising:
    a driving device for driving the image pickup device in a circumferential angle direction and an elevation angle direction,
    wherein said driving device includes a first driving device which drives said image pickup device in the circumferential angle direction, and a second driving device which drives said image pickup device in the elevation angle direction, and
    each of said first driving device and said second driving device constitutes a permanent magnet motor including a planetary reduction gear,
    wherein said permanent magnet motor includes:
    a stator having a winding,
    a rotor which has a permanent magnet, and rotates by passing a current through said winding;
    a rotation shaft which is formed integrally with the rotor, and has a driving gear formed on an outer periphery thereof,
    a planetary gear which is disposed so as to be rotatable around an axis center line of the rotation shaft and meshes with said driving gear, and which is disposed so as to be rotatable on an axis center line extending in parallel to an axial direction of said rotation shaft;

a fixed internal gear which is disposed coaxially with said rotation shaft, fixed to said stator, and meshes with said planetary gear in an inner periphery thereof;

a rotary internal gear which is disposed coaxially with said rotation shaft, disposed so as to be freely rotatable around said axis canter line, meshes with said planetary gear in the inner periphery thereof, and has the number of teeth different from the number of teeth of said fixed internal gear; and a driving shaft which rotates integrally with the rotary internal gear.

12. The driving apparatus according to claim 11, wherein said permanent magnet motor includes a hollow portion present inside a driving shaft which outputs a driving force, and a wiring connected to said image pickup device through the hollow portion.

13. The driving apparatus according to claim 11, wherein said permanent magnet motor includes a conductive member disposed on said driving shaft, and a conducting member which is connected to the conductive member and secures conduction of electricity to the outside from said first driving device or said second driving device.

14. The driving apparatus according to claim 12, wherein said permanent magnet motor includes:

a conductive member disposed on said driving shaft; and a conducting member which is connected to the conductive member and secures conduction of electricity to the outside from said first driving device or said second driving device.

15. The driving apparatus according to claim 11, wherein said fixed internal gear has teeth which are smaller in number than those of the rotary internal gear.

16. The driving apparatus according to claim 15, wherein a teeth number difference between the fixed internal gear and the rotary internal gear is equal to the number of planetary gears provided.

17. The driving apparatus according to claim 11, wherein said planetary gears are at least three in number.

18. The driving apparatus according to claim 17, further comprising a control member configured to control a change in a relative position of the axis center line of the planetary gear.

19. The driving apparatus according to claim 11, wherein said first and second driving devices are made of permanent magnet motors that are similar in structure.

20. The image pickup apparatus according to claim 11, wherein said winding is a three-phase winding.

* * * * *

UNITED STATES PATENT AND TRADEMARK OFFICE
CERTIFICATE OF CORRECTION

PATENT NO.   : 6,707,189 B2
DATED        : March 16, 2004
INVENTOR(S)  : Ito et al.

It is certified that error appears in the above-identified patent and that said Letters Patent is hereby corrected as shown below:

Column 7,
Line 7, change "canter" to -- center --.

Signed and Sealed this

Seventeenth Day of January, 2006

JON W. DUDAS
*Director of the United States Patent and Trademark Office*